(12) United States Patent
Vuksan et al.

(10) Patent No.: US 9,323,835 B2
(45) Date of Patent: Apr. 26, 2016

(54) CLOUD-BASED WEB CONTENT FILTERING

(75) Inventors: Mario Vuksan, Cambridge, MA (US);
Vedran Novoselac, Gradiste (HR);
Mario Matijasevic, Zagreb (HR)

(73) Assignee: Reversing Labs International GmbH, Zurich (CH)

( * ) Notice: Subject to any disclaimer, the term of this patent is extended or adjusted under 35 U.S.C. 154(b) by 396 days.

(21) Appl. No.: 13/069,628

(22) Filed: Mar. 23, 2011

(65) Prior Publication Data

US 2011/0264804 A1 Oct. 27, 2011

Related U.S. Application Data

(60) Provisional application No. 61/316,609, filed on Mar. 23, 2010.

(51) Int. Cl.
| | | |
|---|---|---|
| *G06F 15/173* | (2006.01) | |
| *G06F 15/16* | (2006.01) | |
| *G06F 11/00* | (2006.01) | |
| *H04L 12/58* | (2006.01) | |
| *G06F 17/30* | (2006.01) | |
| *H04L 29/08* | (2006.01) | |

(52) U.S. Cl.
CPC .... *G06F 17/30699* (2013.01); *G06F 17/30867* (2013.01); *H04L 67/02* (2013.01); *H04L 67/2838* (2013.01); *H04L 67/2842* (2013.01); *H04L 67/32* (2013.01); *H04L 67/327* (2013.01)

(58) Field of Classification Search
CPC ... H04L 67/02; H04L 67/327; H04L 67/2838; H04L 67/2842; H04L 67/32
USPC ............ 726/22; 709/206, 203, 219–220, 232, 709/229, 224; 715/239; 455/412.1, 414.3
See application file for complete search history.

(56) References Cited

U.S. PATENT DOCUMENTS

| | | | | |
|---|---|---|---|---|
| 5,751,716 A | * | 5/1998 | Tzannes et al. | 370/468 |
| 5,884,033 A | * | 3/1999 | Duvall | G06F 17/30867 707/E17.109 |
| 5,887,133 A | * | 3/1999 | Brown | G06Q 30/02 709/200 |
| 5,914,756 A | * | 6/1999 | Maeda et al. | 348/563 |
| 5,999,224 A | * | 12/1999 | Maeda et al. | 348/563 |
| 6,018,371 A | * | 1/2000 | Maeda et al. | 348/563 |
| 6,028,644 A | * | 2/2000 | Maeda et al. | 725/110 |
| 6,031,578 A | * | 2/2000 | Maeda et al. | 725/110 |
| 6,037,996 A | * | 3/2000 | Maeda et al. | 348/563 |
| 6,594,682 B2 | * | 7/2003 | Peterson | G06F 17/30867 707/E17.109 |
| 6,605,120 B1 | * | 8/2003 | Fields | G06F 17/30867 707/E17.109 |
| 6,701,350 B1 | * | 3/2004 | Mitchell | G06F 17/30884 705/14.73 |

(Continued)

OTHER PUBLICATIONS

International Search Report and Written Opinion, mailed Jul. 25, 2011, in counterpart International Patent Application No. PCT/US2011/029534, 16 pgs.
Brantner, et al., "Building a Database in the Cloud", Retrieved from the Internet: URL:http://cloud.pubs.dbs.uni-leipzig.de/sites/clouds.pubs.dbs.uni-leipzig.de/files/Bratner2008BuildingaDatabaseintheClouds.pdf, XP002649174, (Oct. 16, 2009), pp. 1-49.

(Continued)

*Primary Examiner* — Viet Vu
*Assistant Examiner* — Michael A Chambers
(74) *Attorney, Agent, or Firm* — Brian J. Colandreo; Michael T. Abramson; Holland & Knight LLP (57) ABSTRACT

A method of filtering web content including maintaining a data store including a plurality of web content filtering rules. A filtering rules query is received from a client device via a network in response to the client device requesting web content. One or more web content filtering rules are transmitted to the client device via the network.

32 Claims, 6 Drawing Sheets

(56) References Cited

U.S. PATENT DOCUMENTS

| | | | |
|---|---|---|---|
| 7,092,999 B2* | 8/2006 | Levitan | 709/218 |
| 7,191,246 B2* | 3/2007 | Deshpande | 709/233 |
| 7,266,588 B2* | 9/2007 | Oku | 709/217 |
| 7,299,409 B2* | 11/2007 | Joshi | G06F 17/3089 707/E17.116 |
| 7,345,996 B2* | 3/2008 | Imiya et al. | 370/229 |
| 7,418,494 B2* | 8/2008 | Dahlin et al. | 709/224 |
| 7,523,393 B2* | 4/2009 | Joshi | G06F 17/3089 715/200 |
| 7,581,017 B2* | 8/2009 | Hattori | 709/232 |
| 7,636,789 B2* | 12/2009 | Li et al. | 709/242 |
| 7,656,799 B2* | 2/2010 | Samuels et al. | 370/231 |
| 7,814,143 B2* | 10/2010 | Brown | G06Q 10/10 600/301 |
| 7,849,403 B2* | 12/2010 | Joshi | G06F 17/3089 715/200 |
| 7,873,710 B2* | 1/2011 | Kiley | G06F 17/30867 455/310 |
| 7,873,740 B2* | 1/2011 | Sitaraman | 709/231 |
| 7,881,200 B2* | 2/2011 | Lee et al. | 370/235 |
| 7,882,172 B2* | 2/2011 | Kodaka et al. | 709/203 |
| 7,929,481 B2* | 4/2011 | Lundby et al. | 370/332 |
| 8,112,308 B1* | 2/2012 | Ho | G06Q 30/02 705/14.41 |
| 8,135,844 B2* | 3/2012 | Kikkawa et al. | 709/227 |
| 8,156,206 B2* | 4/2012 | Kiley | G06F 17/30867 455/310 |
| 8,185,809 B2* | 5/2012 | Luby et al. | 714/786 |
| 8,230,359 B2* | 7/2012 | Robertson | G06F 3/0481 715/798 |
| 8,259,571 B1* | 9/2012 | Raphel | H04L 61/2592 370/230 |
| 8,260,951 B2* | 9/2012 | Chen et al. | 709/231 |
| 8,276,202 B1* | 9/2012 | Dubrovsky | H04L 63/0245 380/30 |
| 8,296,178 B2* | 10/2012 | Hudis | G06F 17/30867 370/401 |
| 8,310,928 B2* | 11/2012 | Samuels et al. | 370/231 |
| 8,370,513 B2* | 2/2013 | Kim | 709/231 |
| 8,370,520 B2* | 2/2013 | Kohli et al. | 709/233 |
| 8,494,535 B2* | 7/2013 | Lundby et al. | 455/450 |
| 8,554,876 B2* | 10/2013 | Winsor | G06F 17/30867 370/229 |
| 8,555,381 B2* | 10/2013 | McLaughlin | H04L 63/1425 713/154 |
| 8,559,406 B2* | 10/2013 | Lundby et al. | 370/338 |
| 8,584,139 B2* | 11/2013 | Katz | G06F 13/387 719/313 |
| 8,639,785 B2* | 1/2014 | Kiley | G06F 17/30867 455/310 |
| 8,725,851 B2* | 5/2014 | Kiley | G06F 17/30867 455/310 |
| 8,812,712 B2* | 8/2014 | Balachandran et al. | 709/231 |
| 8,839,270 B2* | 9/2014 | Chen et al. | 719/318 |
| 8,959,190 B2* | 2/2015 | Kiley | G06F 17/30867 709/220 |
| 2001/0003828 A1* | 6/2001 | Peterson | G06F 17/30867 709/219 |
| 2002/0129159 A1* | 9/2002 | Luby et al. | 709/236 |
| 2002/0184630 A1* | 12/2002 | Nishizawa et al. | 725/44 |
| 2003/0033425 A1* | 2/2003 | Deshpande | 709/233 |
| 2003/0081582 A1* | 5/2003 | Jain et al. | 370/338 |
| 2004/0064577 A1* | 4/2004 | Dahlin et al. | 709/235 |
| 2004/0177147 A1* | 9/2004 | Joshi | G06F 17/3089 709/227 |
| 2004/0190452 A1* | 9/2004 | Imiya et al. | 370/232 |
| 2004/0246924 A1* | 12/2004 | Lundby et al. | 370/332 |
| 2004/0267951 A1* | 12/2004 | Hattori | 709/231 |
| 2005/0063307 A1* | 3/2005 | Samuels et al. | 370/235 |
| 2005/0105471 A1* | 5/2005 | Ido et al. | 370/241 |
| 2005/0243849 A1* | 11/2005 | Wentink | 370/412 |
| 2006/0089969 A1* | 4/2006 | Brown | G06Q 10/10 709/203 |
| 2006/0212531 A1* | 9/2006 | Kikkawa et al. | 709/217 |
| 2007/0094353 A1* | 4/2007 | Brown | G06Q 10/10 709/218 |
| 2007/0098017 A1* | 5/2007 | Lundby et al. | 370/474 |
| 2007/0233891 A1* | 10/2007 | Luby et al. | 709/231 |
| 2007/0268824 A1* | 11/2007 | Kodaka et al. | 370/229 |
| 2007/0268869 A1* | 11/2007 | Lundby et al. | 370/332 |
| 2007/0271332 A1* | 11/2007 | Joshi | G06F 17/3089 709/203 |
| 2007/0271389 A1* | 11/2007 | Joshi | G06F 17/3089 709/231 |
| 2008/0072147 A1* | 3/2008 | Brown | G06Q 10/10 715/273 |
| 2008/0098420 A1* | 4/2008 | Khivesara | G06Q 30/02 725/32 |
| 2008/0120404 A1* | 5/2008 | Sakai | 709/223 |
| 2008/0189360 A1* | 8/2008 | Kiley | G06F 17/30867 709/203 |
| 2008/0208868 A1* | 8/2008 | Hubbard | G06F 17/30867 |
| 2008/0320160 A1* | 12/2008 | Sitaraman | 709/231 |
| 2009/0049496 A1* | 2/2009 | Morton | 725/114 |
| 2009/0094377 A1* | 4/2009 | Zahavi | G06F 17/30905 709/232 |
| 2009/0097361 A1* | 4/2009 | Nakamura | G06F 17/30265 368/29 |
| 2009/0138618 A1* | 5/2009 | Li et al. | 709/242 |
| 2009/0177514 A1* | 7/2009 | Hudis | G06F 17/30867 705/7.33 |
| 2009/0178108 A1* | 7/2009 | Hudis | G06F 17/30867 726/1 |
| 2009/0178109 A1* | 7/2009 | Nice | G06F 17/30867 726/1 |
| 2009/0178131 A1* | 7/2009 | Hudis | G06F 17/30867 726/12 |
| 2009/0178132 A1* | 7/2009 | Hudis | G06F 17/30867 726/12 |
| 2009/0207839 A1* | 8/2009 | Cedervall et al. | 370/390 |
| 2009/0300203 A1* | 12/2009 | Virdi et al. | 709/231 |
| 2010/0005527 A1* | 1/2010 | Jeon | G06F 17/3089 726/22 |
| 2010/0100949 A1* | 4/2010 | Sonwane | H04L 63/20 726/7 |
| 2010/0103819 A1* | 4/2010 | Samuels et al. | 370/235 |
| 2010/0146108 A1* | 6/2010 | Li et al. | 709/224 |
| 2010/0217771 A1* | 8/2010 | Nash | G06F 17/30873 707/769 |
| 2010/0235539 A1* | 9/2010 | Carter | G06F 9/505 709/238 |
| 2010/0235903 A1* | 9/2010 | Carter | H04L 63/0272 726/15 |
| 2010/0257605 A1* | 10/2010 | McLaughlin et al. | H04L 63/1425 726/23 |
| 2010/0311394 A1* | 12/2010 | Pomerantz | G06F 17/30867 455/414.1 |
| 2011/0022682 A1* | 1/2011 | Zanger et al. | 709/219 |
| 2012/0042006 A1* | 2/2012 | Kiley | G06F 17/30867 709/203 |
| 2012/0066586 A1* | 3/2012 | Shemesh | G06F 17/30902 715/235 |
| 2012/0198328 A1* | 8/2012 | Kiley | G06F 17/30867 715/234 |
| 2012/0317652 A1* | 12/2012 | Kiley | G06F 17/30867 726/27 |
| 2012/0331160 A1* | 12/2012 | Tremblay et al. | 709/228 |
| 2013/0325935 A1* | 12/2013 | Kiley | G06F 17/30867 709/203 |
| 2014/0280896 A1* | 9/2014 | Papakostas | H04W 4/001 709/224 |

OTHER PUBLICATIONS

Gianfrancesco, C., et al., "Extansion Based Privacy Protection", Retrieved from the Internet: URL:http://www.wpi.edu/Pubs/E-project/Available/E-project-031207-141503/unrestricted/MQP.pdf, XP002649175, (Mar. 1, 2007), pp. 1-51.

International Preliminary Report on Patentability, mailed Oct. 4, 2012, in counterpart International Patent Application No. PCT/US2011/029534, 11 pgs.

* cited by examiner

CLOUD-BASED WEB CONTENT FILTERING

CROSS-REFERENCE TO RELATED APPLICATION

This application claims the benefit of U.S. provisional patent application Ser. No. 61/316,609, filed on 23 Mar. 2010, the entire disclosure of which is incorporated herein by reference.

TECHNICAL FIELD

The present disclosure generally relates to web content filtering, and more particularly relates to cloud-based web content filtering.

BACKGROUND OF THE DISCLOSURE

Web content filtering is commonly utilized to optimize system performance during consumption of web content, to provide improved security while consuming web content, as well as to improve the web content consumption experience. Often features such as advertisements, explicit material, trackers, and the like may be blocked to achieve the above aims. Such content may be blocked based upon rules that may be locally stored on the computing device through which the web content is accessed. As such, the available storage for content blocking rules may be limited, and the rules may require updating to provide acceptable levels of content blocking.

SUMMARY OF THE DISCLOSURE

According to a first implementation a method includes maintaining, by a computing device, a data store including a plurality of web content filtering rules. A filtering rules query is received from a client device, via a network, in response to the client device requesting web content. One or more web content filtering rules are transmitted to the client device via the network.

One or more of the following features may be included. The network may include one or more of a local area network, a wide area network, and an Internet. The method may further include receiving, from the client device, a web content filter rule submission. The plurality of web content filtering rules may be updated based upon, at least in part, the web content filter rule submission. A validity of the web content filter rule submission may be determined. The one or more web content filtering rules may be based upon, at least in part, an external source.

The method may also include associating at least one category identifier with at least a portion of the plurality of web content filtering rules. The category identifier may be indicative of one or more of a content type, and a content function. Transmitting one or more web content filtering rules to the client device may include transmitting one or more web content filtering rules based upon, at least in part, a user defined category identifier. The method may also include transmitting one or more filtered content rendering rules to the client device. The one or more filtered content rendering rules including instructions for rendering the requested web content.

The method may also include defining a client group. At least a portion of the web content filtering rules may be associated with the client group. Web content filtering rules may be transmitted to the client device based upon, at least in part, participation of the client device in the client group. The client group may include one or more of a defined plurality of users, and a plurality of client devices associated with a group network.

According to another implementation, a computer program product resides on a computer readable medium having a plurality of instructions stored on it. When executed by a processor, the instructions cause the processor to perform operations including maintaining a data store including a plurality of web content filtering rules. Instructions are also included for receiving a filtering rules query from a client device, via a network, in response to the client device requesting web content. One or more web content filtering rules are transmitted to the client device via the network.

One or more of the following features may be included. The network may include one or more of a local area network, a wide area network, and an Internet. Instructions may be included for receiving, from the client device, a web content filter rule submission. The plurality of web content filtering rules may be updated based upon, at least in part, the web content filter rule submission. Instructions may be included for determining a validity of the web content filter rule submission. The one or more web content filtering rules may be based upon, at least in part, an external source.

Instructions may be included for associating at least one category identifier with at least a portion of the plurality of web content filtering rules. The category identifier may be indicative of one or more of a content type, and a content function. The instructions for transmitting one or more web content filtering rules to the client device may include instructions for transmitting one or more web content filtering rules based upon, at least in part, a user defined category identifier. Instructions may also be included for transmitting one or more filtered content rendering rules to the client device. The one or more filtered content rendering rules may include instructions for rendering the requested web content.

Instructions may be included for defining a client group. At least a portion of the web content filtering rules may be associated with the client group. Web content filtering rules may be transmitted to the client device based upon, at least in part, participation of the client device in the client group. The client group may include one or more of a defined plurality of users, and a plurality of client devices associated with a group network.

According to another implementation, a method includes receiving, by a computing device, an indication of a request for web content. A query for web content filtering rules is generated based upon, at least in part, the request for web content. The query for web content filtering rules is transmitted to a data store including a plurality of web content filtering via a network. One or more web content filtering rules are received from the data store. The web content is filtered based upon, at least in part, the received on or more web content filtering rules.

One or more of the following features may be included. The network may include one or more of a local area network, a wide area network, and an Internet. The method may include generating a web content filter rule submission. The web content filter rule submission may be transmitted to the data store. At least one category identifier may be associated with at least a portion of the plurality of web content filtering rules. The category identifier may be indicative of one or more of a content type, and a content function.

Transmitting the query for web content filtering rules to the client device may include transmitting the query for web content filtering rules based upon, at least in part, a user defined category identifier. One or more filtered content rendering rules may be received from the data store. The one or more filtered content rendering rules may include instructions for rendering the requested web content.

The method may include defining a client group. At least a portion of the web content filtering rules may be associated with the client group. Web content filtering rules may be received by the client device based upon, at least in part, participation of the client device in the client group. The client group may include one or more of a defined plurality of users, and a plurality of client devices associated with a group network.

According to another implementation, a computer program product resides on a computer readable medium having a plurality of instructions stored on it. When executed by a processor, the instructions cause the processor to perform operations including receiving an indication of a request for web content. A query for web content filtering rules is generated based upon, at least in part, the request for web content. The query for web content filtering rules is transmitted to a data store including a plurality of web content filtering via a network. One or more web content filtering rules are received from the data store. The web content is filtered based upon, at least in part, the received one or more web content filtering rules.

One or more of the following features may be included. The network may include one or more of a local area network, a wide area network, and an Internet. Instructions may be included for generating a web content filter rule submission. The web content filter rule submission may be transmitted to the data store. At least one category identifier may be associated with at least a portion of the plurality of web content filtering rules. The category identifier may be indicative of one or more of a content type, and a content function. The instructions for transmitting the query for web content filtering rules to the client device may include instructions for transmitting the query for web content filtering rules based upon, at least in part, a user defined category identifier. Instructions may be included for receiving one or more filtered content rendering rules from the data store. The one or more filtered content rendering rules may include instructions for rendering the requested web content.

Instructions may also be included for defining a client group. At least a portion of the web content filtering rules may be associated with the client group. Web content filtering rules may be received by the client device based upon, at least in part, participation of the client device in the client group. The client group may include one or more of a defined plurality of users, and a plurality of client devices associated with a group network.

The details of one or more implementations are set forth in the accompanying drawings and the description below. Other features will become apparent from the description, the drawings, and the claims.

DETAILED DESCRIPTION OF EXEMPLARY EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
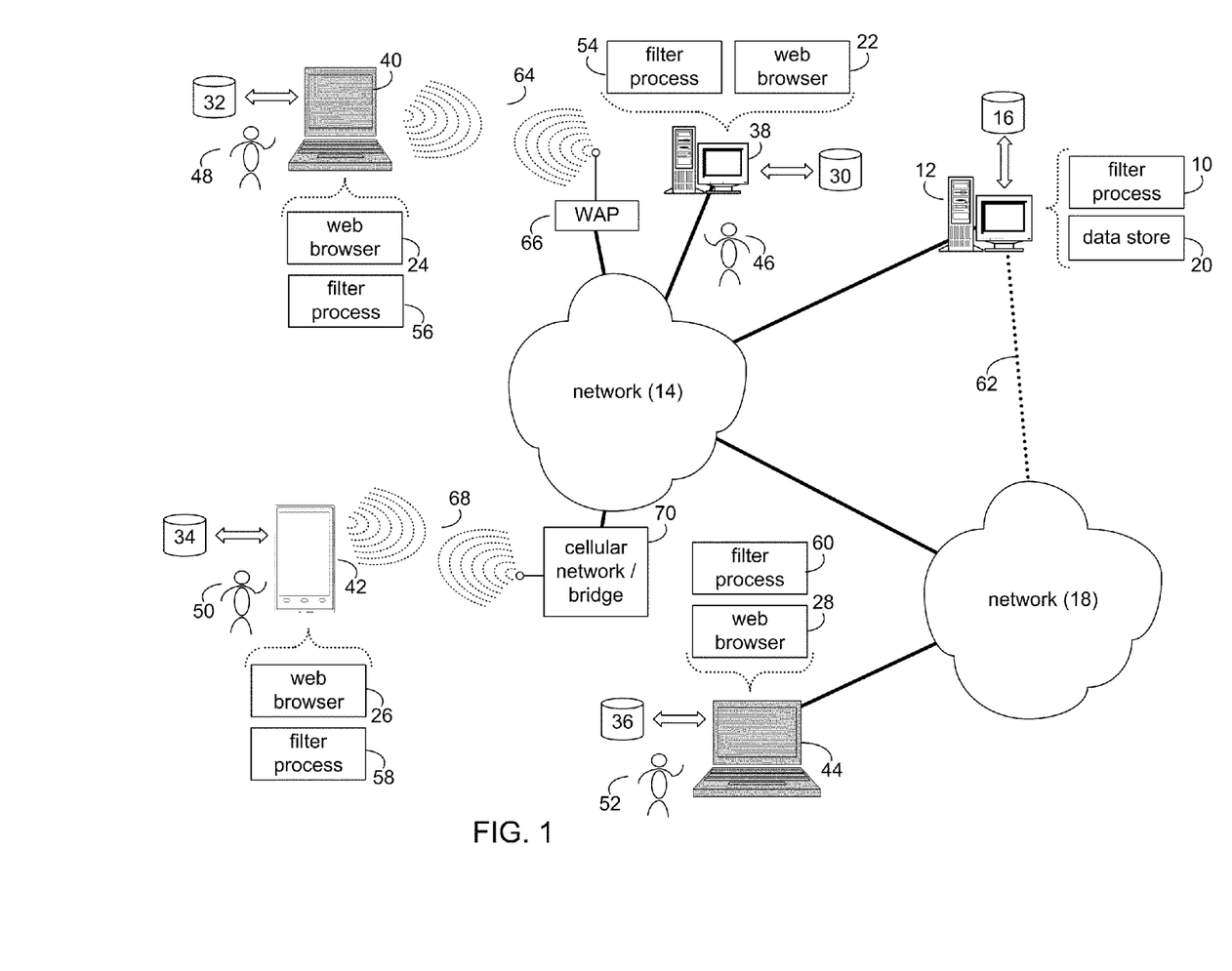
FIG. 1 diagrammatically depicts a filter process coupled to a distributed computing network.

Referring to FIG. 1, there is shown filter process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the filter process may reside on and be executed, in whole or in part, by a client electronic device, such as a personal computer, notebook computer, personal digital assistant, or the like.

As will be discussed below in greater detail, filter process 10 may maintain a data store including a plurality of web content filtering rules. Filter process 10 may also receive a filtering rules query from a client device, via a network, in response to the client device requesting web content. Filter process 10 may further transmit one or more web content filtering rules to the client device via the network.

The instruction sets and subroutines of filter process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute a data store application (e.g., data store application 20), examples of which may include, but is not limited to e.g., a database. Data store application 20 may include/maintain a plurality of web content filtering rules that may be utilized by a client web browser application (e.g., web browsers 22, 24, 26, 28) for filtering web content. Examples of web browsers 22, 24, 26, 28 may include, but are not limited to, e.g., Microsoft Internet Explorer®, Apple® Safari®, etc. (Internet Explorer is a registered trademark of Microsoft Corporation in the United States, other countries, or both, and Apple and Safari are registered trademarks of Apple Inc. in the United States, other countries, or both).

Filter process 10 may be a stand alone application, or may be an applet/application/script that may interact with and/or be executed within data store application 20. In addition/as an alternative to being a server-side process, the filter process may include a client-side process (described below) that may reside on a client electronic device (described below) and may interact with a web browser (e.g., one or more of web browsers 22, 24, 26, 28). Further, the filter process may be a hybrid server-side/client-side process that may interact with data store application 20 and a web browser (e.g., one or more of web browsers 22, 24, 26, 28). As such, the filter process may reside, in whole, or in part, on server computer 12 and/or one or more client electronic devices.

The instruction sets and subroutines of data store application 20, which may be stored on storage device 16 coupled to server computer 12 may be executed by one or more processors (not shown) and one or more memory modules (not shown) incorporated into server computer 12.

The instruction sets and subroutines of web browsers 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, net book, or the like), notebook computer 44, for example. Using web browsers 22, 24, 26, 28, users 46, 48, 50, 52 may access web content (e.g., web pages, web applications, and the like) via one or more of networks 14, 18. Additionally, using web browsers 22, 24, 26, 28, users 46, 48, 50, 52 may access web content filtering rules included in/maintained by data store application 20 to thereby filter accessed web content.

As mentioned above, the filter process may reside, in whole or in part, on a client electronic device (e.g., client electronic device 38, 40, 42, 44). For example, client electronic devices 38, 40, 42, 44 may respectively execute a client-side filter process (e.g., filter processes 54, 56, 58, 60). Filter processes 54, 56, 58, 60 may each include a stand alone application, or may be an applet/application/script that may interact with and/or be executed within web browsers 22, 24, 26, 28. The instruction sets and subroutines of filter processes 54, 56, 58, 60, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively).

As will be discussed in greater detail below, the client-side filter process (e.g., filter processes 54, 56, 58, 60), alone or in conjunction with a web browser, may receive an indication of a request for web content. A query for web content filtering rules may be generated based upon, at least in part, the request for web content. The query for web content filtering rules may be transmitted to a data store (e.g., data store 20) including a plurality of web content filtering via a network. One or more web content filtering rules may be received from the data store. The web content may be filtered based upon, at least in part, the received on or more web content filtering rules.

Users 46, 48, 50, 52 may access data store application 20 directly through the device on which the web browser (e.g., web browsers 22, 24, 26, 28) is executed, namely client electronic devices 38, 40, 42, 44, for example. Users 46, 48, 50, 52 may access data store application 20 directly through network 14 or through secondary network 18. Further, server computer 12 (i.e., the computer that executes scheduling application 20) may be connected to network 14 through secondary network 18, as illustrated with phantom link line 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 64 established between laptop computer 40 and wireless access point (i.e., WAP) 66, which is shown directly coupled to network 14. WAP 66 may be, for example, an IEEE 802.11a, 802.11b, 802.11g, Wi-Fi, EDGE, 3G, Wi-MAX and/or Bluetooth device that is capable of establishing wireless communication channel 64 between laptop computer 40 and WAP 66. Mobile computing device 42 is shown wirelessly coupled to network 14 via wireless communication channel 68 established between mobile computing device 42 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

For the purpose of the following description, web browser 22 and filter application 54 may be discussed. However, this is for illustrative purposes only and should not be construed as a limitation of the present disclosure, as other web browsers (e.g., web browsers 24, 26, 28) and other filter processes (e.g., filter processes 56, 58, 60) may be equally utilized.

Figure 2:
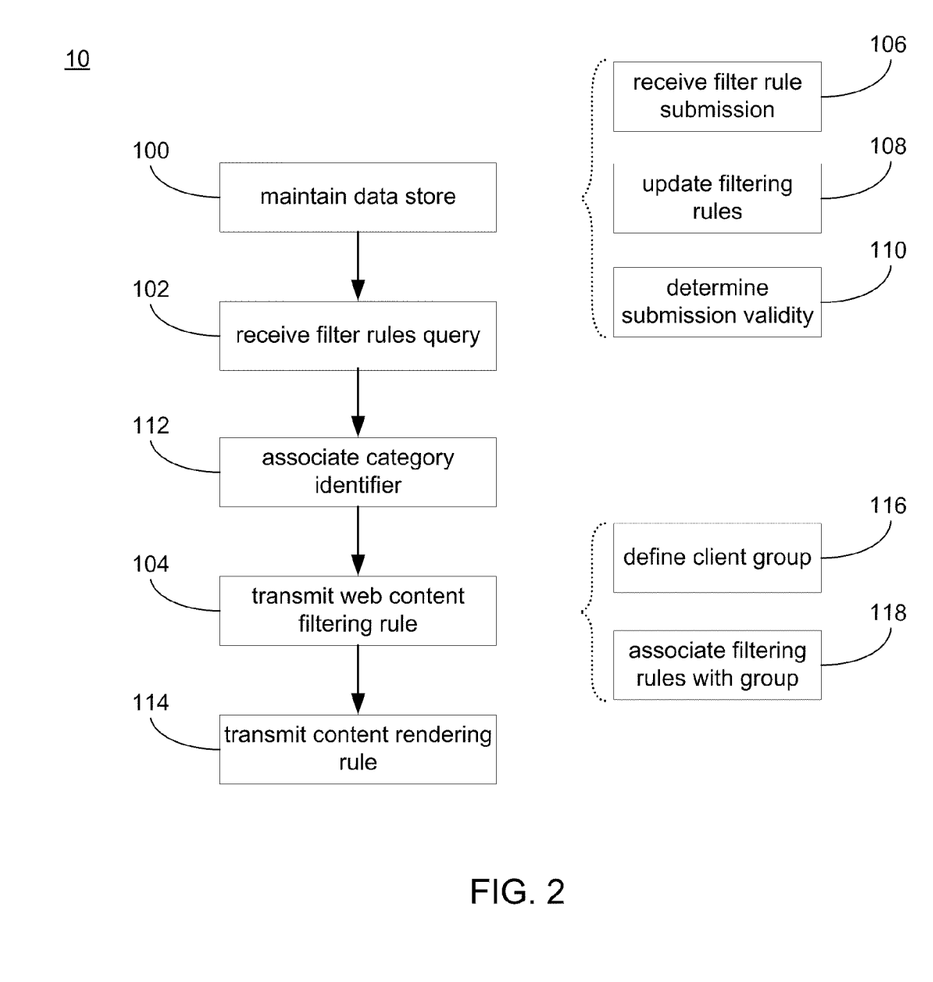
FIG. 2 is a flow chart of a process executed by the server-side filter process of FIG. 1.
Figure 3:
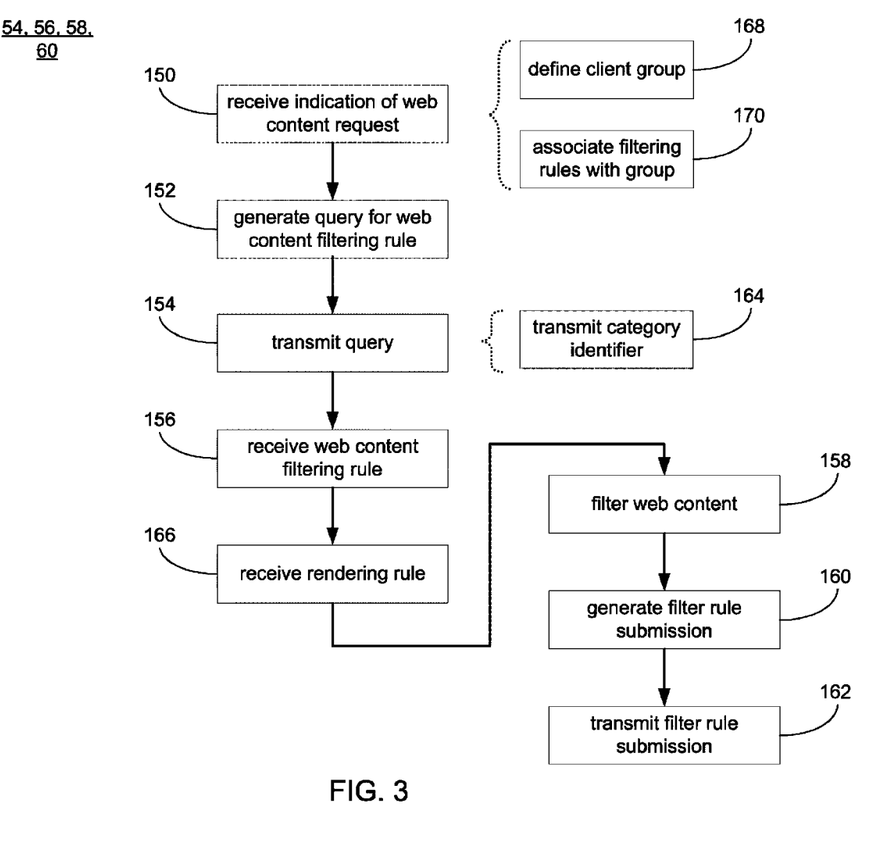
FIG. 3 is a flow chart of a process executed by the client-side filter process of FIG. 1.

With reference to FIGS. 2 and 3, assume that user 45 is accessing web content using web browser 22. User 46 may input a request for web content into browser 22 (e.g., by entering a universal resource locator, "URL", into web browser 22 using an input device, such as a keyboard, associated with computing device 36). The web content may include, but is not limited to, a web page, a web application, or the like. Upon user 46 entering the request for web content, filter process 54 (e.g., which may be integrated into or otherwise interact with web browser 22) may receive 150 an indication of the request for web content. In response to receiving 150 the indication of the request for web content, filter process 54 may generate 152 a query for web content filtering rules based upon, at least in part, the received 150 request for web content. The generated 152 query for web content filtering rules may include, for example, an identifier of the requested web content, such as the requested URL, or other identifier of the requested web content. Filter process 54 may further transmit 154 the query for web content filtering rules to a data store (e.g., data store 20, alone and/or in conjunction with filter process 10) including a plurality of web content filtering rules. The query may be transmitted 154 via a network, such as network 14, or 18. As discussed above, networks 14, 18 may include, for example, local area networks, wide area networks, the internet, or other such computing network.

Filter process 10 may maintain 100 data store 20, which may include a plurality of web content filtering rules. Filter process 10 may receive 102 the filtering rules query transmitted 154 in response to the requested web content by client device 38 (e.g., transmitted by filter process 54 and/or web browser 22). Filter process 10 may execute the received 102 filtering rules query over data store 20, which may return a results set of web content filtering rules applicable to the web content requested by client device 38 (e.g., via web browser 22). Filter process 10 may transmit 104 one or more web content filtering rules to client device 38 via networks 14, 18. The one or more web content filtering rules may, for example, identify portions, components, features, or the like, of the requested web content that may be blocked, disabled, or removed from the requested web content prior to, and/or during, rendering of the web content by a web browser (such as, for example, web browser 22). In addition to any rules specific to the requested web content, filter process 10 may optionally also transmit general web content filtering rules. In terms of general web content filtering rules, filter process 10 may, for example, transmit a list of known ad-servers, URL's associated with malicious content, pornographic content, etc., as may be generally known. The optional transmission of general web content filtering rules may be configured according to system and/or user preferences, which may be defined in a conventional manner (e.g., via preference configuration settings and graphical user interfaces).

Filter process 54 may receive 156 the one or more web content filtering rules transmitted 104 by filter process 10.

Further, filter process 54 (alone and/or in conjunction with web browser 22) may filter 158 the web content (e.g., which may be received by web browser 22 based upon the request for the web content) based upon, at least in part, the received 156 one or more web content filtering rules. For example, filtering 158 the received web content may include blocking, disabling, and/or removing portions of the requested web content, and/or features or components within the requested web content as, or before, the requested web content is rendered by web browser 22. For example, filtering 158 the received web content may include blocking advertisements included within the web content, disabling and/or blocking selected java script or flash items, or otherwise blocking, removing, disabling, or the like, selected portions of the requested web content or features or components of the requested web content. As such, the requested web content may be displayed having portions, features, or components blocked, removed, or disabled, based upon, at least in part, the one or more web content filtering rules.

Consistent with this aspect of the present disclosure, data store 20 may include large sets of web content filtering rules, for example which may consume large amounts of memory and storage to the point of being impractical or inconvenient to store on a client electronic device. This may be especially true for constrained devices, such as tablets, net books, smart phones, and the like, which may have relatively small amounts of available storage. Additionally, as the web content filtering rules may be stored in a central data store (e.g., data store 20), any updates or changes to the web content filtering rules may be immediately implemented and available to all users, without the need to update a local repository of filtering rules. According to one aspect, at least a portion of the received 156 web content filtering rules may be locally cached (e.g., by filter process 55 and/or web browser 22). As such, the locally cached web content filtering rules may be available without subsequent requests to filter process 10. Such locally cached rules may be applicable to other web content associated with a common domain, or the like. In a similar manner, filter process(s) 10, 55 may utilize a network caching infrastructure and/or utilize a content delivery network arrangement. In such an embodiment, at least a portion of the web content filtering rules (and/or a copy of at least a portion of the web content filtering rules) may additionally be stored on a network accessible storage device accessible by client device 38 (in the foregoing example). As such, filter process 55 may access at least a portion of the web content filtering rules from either data store 20 or the network accessible storage device (e.g., depending upon available bandwidth, or other networking considerations).

According to one aspect, filter process 10 may leverage a user community to aid in building a robust catalog of web content filtering rules. For example, filter process 10 may provide a mechanism for receiving user submissions of suggested web content filtering rules. In this regard, as the usership of filter process 10 grows, and the life cycle of filter process 10 advances, the available web content filtering rules may similarly expand.

Figure 4:
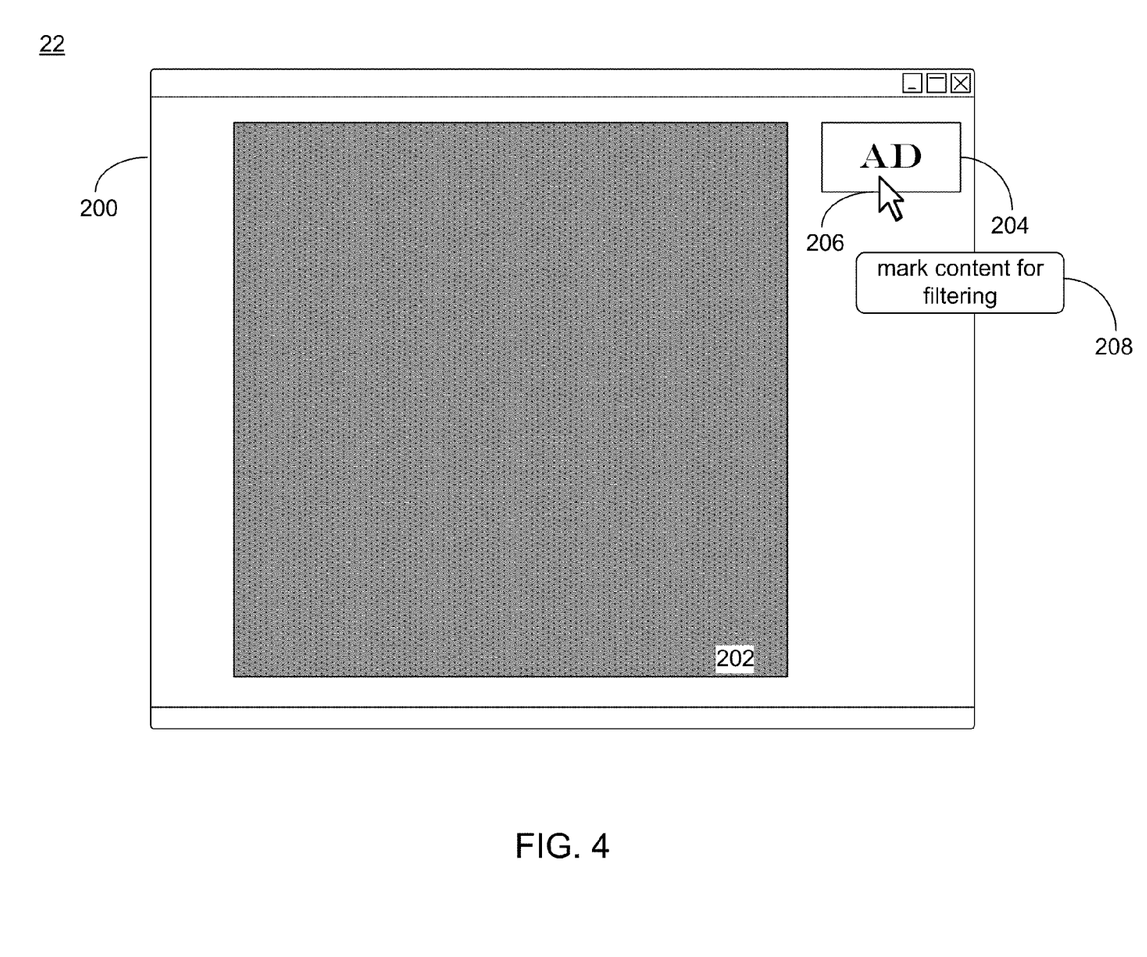
FIG. 4 diagrammatically depicts web content rendered by a web browser of FIG. 1.

Continuing with the foregoing concept, and with additional reference to FIG. 4, assume that requested web content (e.g., web page) 200 may be rendered via web browser 22. Web page 200 may include first web content 202, such as an article or other content. Additionally, web page 200 may include feature 204 that user 46 believes should be filtered. For example, feature 204 may include an advertisement, flash content, pornographic content, a tracker, a widget, unrelated content panel, or any other content that user 46 may consider worthy of blocking User 46 may mark feature 204 as content to be filtered. For example, user 46 may select, via onscreen pointer 206 (which may be controlled by a pointing device, such as a mouse or gestural touch-screen interface; not shown) feature 204 by right clicking feature 204. In response to user 46 right clicking feature 204 filter process 54 (alone or in conjunction with web browser 22) may generate popup 208. While popup 208 is shown including a single option (namely "mark content for filtering") other options (e.g., an identifier of the category of the content, etc.) may be included within popup 208 depending upon design criteria and user need. User 46 may select, via onscreen pointer 206, the option "mark content for filtering" from within popup 208. Selecting the option "mark content for filtering" may result in filter process 54 (alone or in conjunction with web browser 22) generating 160 a web content filter rule submission. Further, filter process 54 may transmit 162 the web content filter rule submission to data store 20. Transmitting 162 the web content filter rule submission may include transmitting an identifier of web page 200 (e.g., may transmit the URL or other identifier of the web page or web application), and/or may transmit an identifier of feature 204 (e.g., may transmit a link associated with feature 204, html code or java script, etc., associated with feature 204, or the like).

Filter process 10 may receive 106 the web content filter rule submission from filter process 54. Further, filter process 10 may update 108 the plurality of web content filtering rules (included within data store 20) based upon, at least in part, the web content filter rule submission. For example, filter process 10 may create a new web content filtering rule (and/or update an existing web content filtering rule) based upon, at least in part, the received 106 web content filter rule submission. For example, a new web content filter rule may include an identifier of the URL associated with web page 200 (e.g., the URL of the web page) as well as an identifier associated with feature 204.

Filter process 10 may, in some embodiments, determine 110 the validity of the web content filter rule submission. According to one aspect, it may be possible for filter process 10 to automatically determine 110 the validity of the web content filter rule submission. For example, a like associated with feature 204 may be correlated to a known ad-server, or other automatically identifiable source of content that may desirably be filtered. Additionally/alternatively, the received 106 web content filter rule submission may be manually examined by a support representative. In such an embodiment, filter process 10 may determine 110 the validity of the web content filter rule submission based upon an indication input by the support representative. If the validity is confirmed, filter process 10 may update 108 the plurality of web content filtering rules based upon, at least in part, the web content filtering rule submission. Upon updating 108 the plurality of web content filtering rules, the updated rules may be immediately accessible by users of the system. Consistent with this aspect, as the number or user submissions increases, the web content filtering rules included within date store 20 may increase, and may provide enriched filtering capacity.

In addition to web content filter rule submissions from users, web content filtering rules may be based upon, at least in part, external sources. Such external sources may arise, for example, from third party feeds or information. The web content filtering rules based upon, at least in part, external sources may, for example, allow potentially malicious content to be filtered out of requested web content (e.g., web page 200). Various examples of web content filtering rules (included within data store 20, resulting from web content filtering rule submissions, and web content filtering rules based upon, at least in part, external sources) may relate to filtering content such as advertisements, malicious features, objectionable content, items (content, features, components, or the like) that may give rise to privacy concerns (e.g., trackers) or performance concerns. Such examples should not be construed as limiting however. For example, web content filtering rules may relate to filtering any web content (e.g., content included within a web page or web application, portions of content within a web page or web application, features or components included within the web page or web application, such as java script items, flash items, etc.) that may be unwanted by a user, an administrator, a vendor, or the like, regardless of the nature of the web content. As such, the content to be filtered need not be functional, or even visible to a consumer of the requested web content (e.g., the web page or web application). Further, content may be filtered (e.g., based upon, at least in part, a web content filtering rule) based upon, at least in part, a corporate policy (e.g., no hate speech or content unrelated to the business of the corporation), law (e.g., no access to gambling web applications or fragments), to trust (e.g., parental control and non-work related web sites and applications) or the like.

According to another aspect, filter process 10 may associate 112 at least one category identifier with at least a portion of the plurality of web content filtering rules included within data store 20. For example, category identifiers may indicate that a given rule is directed at filtering advertising material, trackers, widgets, unrelated content panes such as market places or blogs, or any other category of content that may be filtered based upon, at least in part, the given web content filtering rule. In this manner, the category identifier may be indicative of one or more of a content type, and a content function. The associated 112 category identifier may include a tag, a relational feature, or the like, associated with a given web content filtering rule, or collection of web content filtering rules. Referring back to the previous aspect of the present disclosure, in addition to simply allowing a feature (e.g., feature 204) of a piece of web content (e.g., web page 200) to be marked for filtering, one or more of filter processes 10, 54 may allow a category identifier to also be associated 112 with the feature.

Continuing with this aspect of the present disclosure, transmitting 154 the query for web content filtering rules by the client device may include transmitting 164 the query for web content filtering rules based upon, at least in part, a user defined category identifier. For example, filter process 54 may allow user 46 to specify preferences of categories of web content to be filtered. For example, user 46 may specify preferences to filter advertisements and trackers, but not to filter widgets. As such, transmitting 154 the query for web content filtering rules may include transmitting 164 the query for web content filtering rules only for advertisements and trackers, but not for widgets. Of course, various additional/alternative preferences of web content categories may be specified.

Transmitting 104 one or more web content filtering rules to the client device may include transmitting one or more web content filtering rules based upon, at least in part, a user defined category identifier. For example, in an embodiment in which filter process 54 may transmit 164 the query for web content based upon, at least in part, a user defined category identifier, filter process 10 may execute a query over data store 20 relative to the web content requested by web browser 22 and the user defined category identifiers. In a related embodiment, a user profile may be maintained by filter process 10. Accordingly, all queries for web content filtering rules by user 46 may be based upon, at least in part, the user defined category identifiers. Filter process 104 may transmit one or more web content filtering rules based upon, at least in part, a user defined category identifier to client device 38.

According to a further aspect, filtering processes 10, 54 may provide options for rendering filtered web content. That is, the manner in which the region of the requested web content (e.g., web page 200) corresponding to the filtered web content (e.g., feature 204 in the foregoing examples) may be rendered according to various preferences or rules. In one embodiment, to implement this aspect filter process 10 may transmit 114 a content rendering rule to the client device (e.g., client device 38). The content rendering rule may include instructions (e.g., which may be utilized by filter process 54 and/web browser 22) for rendering the requested web content (e.g., web page 200). Correspondingly, filter process 54 may receive 166 the one or more filtered content rendering rules from data store. Filter process 54 may render the requested web content (e.g., web page 200) according to the instructions of the filtered content rendering rules.

Figure 5:
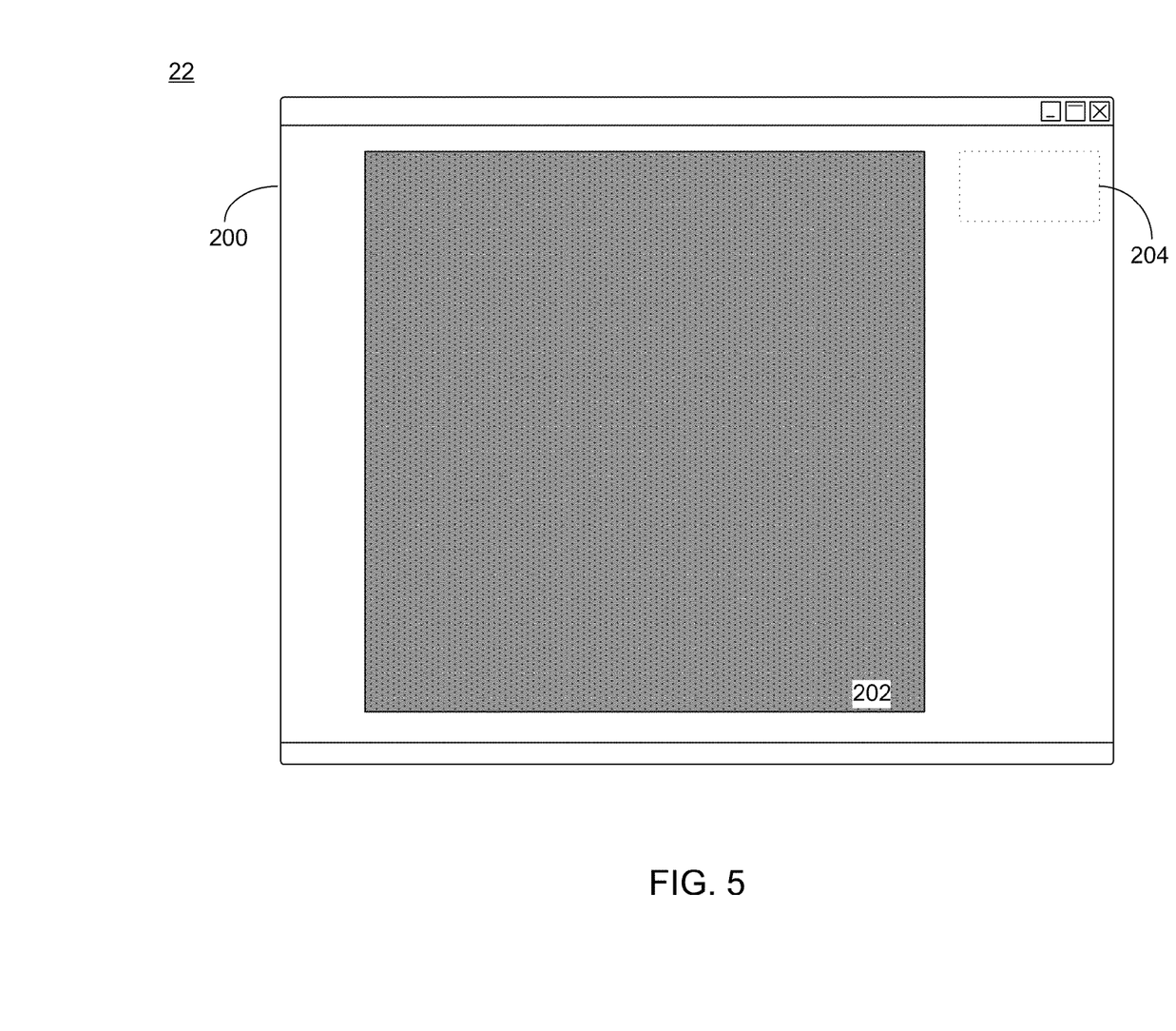
FIG. 5 diagrammatically depicts web content rendered by a web browser of FIG. 1.
Figure 6:
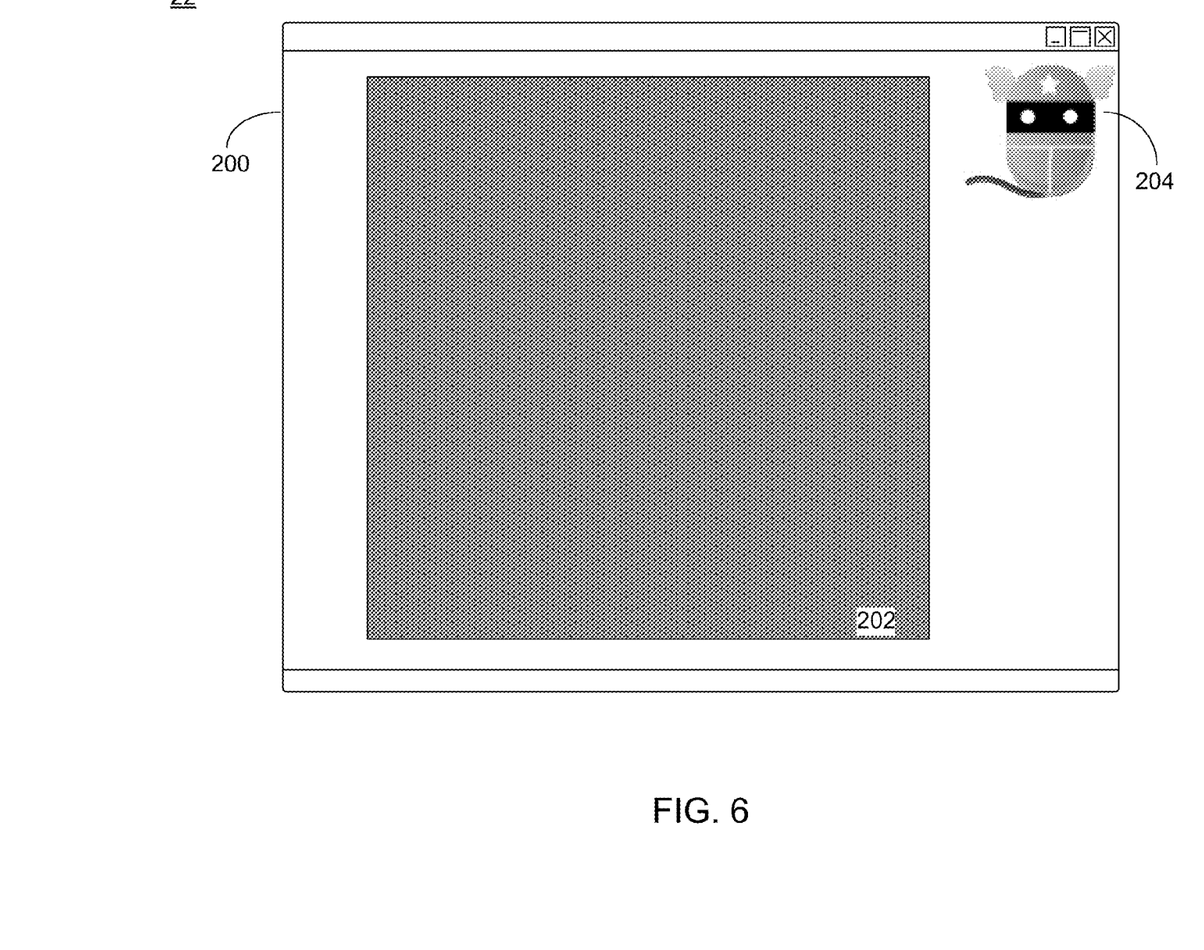
FIG. 6 diagrammatically depicts web content rendered by a web browser of FIG. 1.

For example, the content rending rule may include instructions for omitting the filtered web content (e.g., feature 204). As such, web page 200 may include a blank region corresponding to the location of feature 204. In the event that the filtered web content resides in other content (e.g., the filtered web content is, for example, and advertisement located in a paragraph of text) the rendering instructions may include instructions to close up the text, thereby providing an uninterrupted paragraph of text. Additionally/alternatively other features may be placed in the region of web page corresponding to filtered web content (e.g., feature 204). For example, as shown in FIG. 5, the feature 204 may be replaced by a phantom box, thereby providing a visual indicator that web content has been filtered from web page 204. Various additional/alternative images, animations, etc., may similarly be displayed in the region corresponding to the filtered web content. For example, as shown in FIG. 6, an image, such as a corporate logo, or other image, may be place in the region corresponding to feature 204, which has been filtered from web page 200.

In addition/as an alternative to the foregoing example of the removal of the content, placement of phantom box, image, or the like, the content rendering rules may allow the filtered web content (e.g., feature 204 within web page 200) may be replaced by content from a dynamic source. Examples of dynamic sources may include, for example, content from another ad server, social network site or page, a web feed, or an external database. Various additional/alternative implementations may be equally utilized.

In addition/as an alternative to receiving web content rendering rules from filter process 10, filter process 54 may provide for user preferences for rendering filtered web content. For example, user 46 may specify (e.g., via one or more of filter process 54 and web browser 22) how filtered web content should be rendered. As such, user 46 may customize the appearance of rendered web content having filtered features.

In addition/as an alternative to providing web content filtering for individual users, the filtering process herein may allow web content filtering across multiple client devices or users. For example, such an aspect may be implemented in an enterprise environment, a social network, or other group-level environment. In such a manner, for example, a central administrator may establish web content filtering rules that may be implemented across more than one client electronic device or user.

Consistent with the foregoing description, rather than providing URL level filtering (e.g., in which entire web sites may be blocked), the filter process herein may provide filtering of individual items of web content within, e.g., a web page, web application, or the like. According to the instant aspect, group-level filtering profiles may be defined and implemented across multiple client devices and/or user profiles (e.g., based upon, at least in part, user provided login credentials, licensing keys or the like).

In one example, one or more of filter processes 10, 54 may define 116, 168 a client group. For example, user 46 may be an administrative user. User 46 may, accordingly, input a user group (e.g., including one or more identified client electronic devices, such as 40, 42, 44; or one or more users, such as user 48, 50, 52 based upon user profiles, user credentials, or the like). One or more of filter processes 10, 54 may define 116, 186 the client group based upon, at least in part, the input from user 46. At least a portion of the web content filtering rules may be associated 118, 170 with the client group. For example, web content filtering rules based upon categories of web content to be filtered may be associated 118, 170 with the client group. In one example, the web content filtering rules associated 118, 170 with the client group may specify that advertisements and trackers should be filtered. Other variations may equally be utilized. Web content filtering rules may be transmitted 104 by filter process 10 and received 156 by one or more of filter processes 56, 58, 60 based upon, at least in part participation of the client device (e.g., devices 40, 42, 44) in the client group. The respective client devices 40, 42, 44 may participate in the client group by virtue of having been specifically identified as participating the client group, by virtue of residing on a commonly controlled and specified network, by virtue of a specified user being logged onto one of the client devices, or the like. As indicated above, the client group may include one or more of a defined plurality of users, a plurality of client devices associated with a group network, or other similar association.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method comprising:
   maintaining, by a computing device, a data store including a plurality of web content filtering rules;
   receiving, by the computing device, a filtering rules query from a client device, via a network, in response to the client device requesting web content;
   transmitting, by the computing device, one or more web content filtering rules to the client device via the network, wherein the one or more web content filtering rules transmitted to the client device is applicable to the web content requested by the client device, wherein the one or more web content filtering rules transmitted to the client device in response to the client device requesting web content include an identification of a portion of the web content to filter and instructions for rendering the portion of the web content;
   prior to rendering the requested web content, filtering, by the computing device, a portion of the web content based upon, at least in part, the transmitted one or more web content filtering rules; and
   prior to rendering the requested web content, replacing, by the computing device, the filtered portion of the web content with dynamic replacement content.

2. The computer implemented method according to claim 1, wherein the network includes one or more of a local area network, a wide area network, and an Internet.

3. The computer implemented method according to claim 1, further including:
   receiving, from the client device, a web content filter rule submission; and
   updating the plurality of web content filtering rules based upon, at least in part, the web content filter rule submission.

4. The computer implemented method according to claim 3, further including determining a validity of the web content filter rule submission.

5. The computer implemented method according to claim 1, further including associating at least one category identifier with at least a portion of the plurality of web content filtering rules, the category identifier being indicative of one or more of a content type, and a content function.

6. The computer implemented method according to claim 5, wherein transmitting one or more web content filtering rules to the client device includes transmitting one or more web content filtering rules based upon, at least in part, a user defined category identifier.

7. The computer implemented method according to claim 1, further including:
   defining a client group;
   associating at least a portion of the web content filtering rules with the client group; and
   transmitting web content filtering rules to the client device based upon, at least in part, participation of the client device in the client group.

8. The computer implemented method according to claim 7, wherein the client group includes one or more of a defined plurality of users, and a plurality of client devices associated with a group network.

9. The computer implemented method according to claim 1, wherein the one or more web content filtering rules are based upon, at least in part, an external source.

10. A computer program product residing on a non-transitory computer readable medium having a plurality of instructions stored thereon, which, when executed by a processor, cause the processor to perform operations comprising:
    maintaining a data store including a plurality of web content filtering rules;
    receiving a filtering rules query from a client device, via a network, in response to the client device requesting web content;
    transmitting one or more web content filtering rules to the client device via the network, wherein the one or more web content filtering rules transmitted to the client device is applicable to the web content requested by the client device, wherein the one or more web content filtering rules transmitted to the client device in response to the client device requesting web content include an identification of a portion of the web content to filter and instructions for rendering the portion of the web content;
    prior to rendering the requested web content, filtering a portion of the web content based upon, at least in part, the transmitted one or more web content filtering rules; and
    prior to rendering the requested web content, replacing the filtered portion of the web content with dynamic replacement content.

11. The computer program product according to claim 10, wherein the network includes one or more of a local area network, a wide area network, and an Internet.

12. The computer program product according to claim 10, further including instructions for:
    receiving, from the client device, a web content filter rule submission; and
    updating the plurality of web content filtering rules based upon, at least in part, the web content filter rule submission.

13. The computer program product according to claim 12, further including instructions for determining a validity of the web content filter rule submission.

14. The computer program product according to claim 10, further including instructions for associating at least one category identifier with at least a portion of the plurality of web content filtering rules, the category identifier being indicative of one or more of a content type, and a content function.

15. The computer program product according to claim 14, wherein the instructions for transmitting one or more web content filtering rules to the client device include instructions for transmitting one or more web content filtering rules based upon, at least in part, a user defined category identifier.

16. The computer program product according to claim 10, further including instructions for:
    defining a client group;
    associating at least a portion of the web content filtering rules with the client group; and
    transmitting web content filtering rules to the client device based upon, at least in part, participation of the client device in the client group.

17. The computer program product according to claim 16, wherein the client group includes one or more of a defined plurality of users, and a plurality of client devices associated with a group network.

18. The computer program product according to claim 10, wherein the one or more web content filtering rules are based upon, at least in part, an external source.

19. A computer implemented method comprising:
    receiving, by a computing device, an indication of a request for web content;
    generating, by the computing device, a query for web content filtering rules based upon, at least in part, the request for web content;
    transmitting, by the computing device, the query for web content filtering rules to a data store including a plurality of web content filtering via a network;
    receiving, by the computing device, one or more web content filtering rules from the data store, wherein the one or more web content filtering rules received by the computing device is applicable to the web content requested by the computing device, wherein the one or more web content filtering rules transmitted to the client device in response to the client device requesting web content include an identification of a portion of the web content to filter and instructions for rendering the portion of the web content;
    prior to rendering the requested web content, filtering, by the computing device, a portion of the web content based upon, at least in part, the received one or more web content filtering rules; and
    prior to rendering the requested web content, replacing, by the computing device, the filtered portion of the web content with dynamic replacement content.

20. The computer implemented method according to claim 19, wherein the network includes one or more of a local area network, a wide area network, and an Internet.

21. The computer implemented method according to claim 19, further including:
    generating a web content filter rule submission; and
    transmitting the web content filter rule submission to the data store.

22. The computer implemented method according to claim 19, wherein at least one category identifier is associated with at least a portion of the plurality of web content filtering rules, the category identifier being indicative of one or more of a content type, and a content function.

23. The computer implemented method according to claim 22, wherein transmitting the query for web content filtering rules by the client device includes transmitting the query for web content filtering rules based upon, at least in part, a user defined category identifier.

24. The computer implemented method according to claim 19, further including:
    defining a client group;
    associating at least a portion of the web content filtering rules with the client group; and
    receiving web content filtering rules by the client device based upon, at least in part, participation of the client device in the client group.

25. The computer implemented method according to claim 24, wherein the client group includes one or more of a defined plurality of users, and a plurality of client devices associated with a group network.

26. A computer program product residing on a non-transitory computer readable medium having a plurality of instructions stored thereon, which, when executed by a processor, cause the processor to perform operations comprising:
   receiving an indication of a request for web content;
   generating a query for web content filtering rules based upon, at least in part, the request for web content;
   transmitting the query for web content filtering rules to a data store including a plurality of web content filtering via a network;
   receiving one or more web content filtering rules from the data store, wherein the one or more web content filtering rules received from the data store is applicable to the web content requested, wherein the one or more web content filtering rules transmitted to the client device in response to the client device requesting web content include an identification of a portion of the web content to filter and instructions for rendering the portion of the web content;
   prior to rendering the requested web content, filtering a portion of the web content based upon, at least in part, the received one or more web content filtering rules; and
   prior to rendering the requested web content, replacing the filtered portion of the web content with dynamic replacement content.

27. The computer program product according to claim 26, wherein the network includes one or more of a local area network, a wide area network, and an Internet.

28. The computer program product according to claim 26, further including instructions for:
   generating a web content filter rule submission; and
   transmitting the web content filter rule submission to the data store.

29. The computer program product according to claim 26, wherein at least one category identifier is associated with at least a portion of the plurality of web content filtering rules, the category identifier being indicative of one or more of a content type, and a content function.

30. The computer program product according to claim 29, wherein the instructions for transmitting the query for web content filtering rules to the client device include instructions for transmitting the query for web content filtering rules based upon, at least in part, a user defined category identifier.

31. The computer program product according to claim 26, further including instructions for:
   defining a client group;
   associating at least a portion of the web content filtering rules with the client group; and
   receiving web content filtering rules by the client device based upon, at least in part, participation of the client device in the client group.

32. The computer program product according to claim 31, wherein the client group includes one or more of a defined plurality of users, and a plurality of client devices associated with a group network.

* * * * *